United States Patent
Kasmani et al.

(10) Patent No.: US 12,032,587 B2
(45) Date of Patent: Jul. 9, 2024

(54) EXTRACTING DATA BASED ON DATA EXTRACTION CONFIGURATIONS

(71) Applicant: SAP SE, Walldorf (DE)

(72) Inventors: Anis Kasmani, Union City, CA (US); Panish Ramakrishna, Bengaluru (IN); Prithvi Krishna Thodla Chandrasekhar, Pleasanton, CA (US); Arasan Rajendren, San Diego, CA (US); Sriram Narasimhan, Pleasanton, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/057,674

(22) Filed: Nov. 21, 2022

(65) Prior Publication Data

US 2024/0168969 A1 May 23, 2024

(51) Int. Cl.
*G06F 7/02* (2006.01)
*G06F 16/00* (2019.01)
*G06F 16/23* (2019.01)
*G06F 16/2455* (2019.01)
*G06F 16/25* (2019.01)

(52) U.S. Cl.
CPC ........ *G06F 16/254* (2019.01); *G06F 16/2379* (2019.01); *G06F 16/2455* (2019.01)

(58) Field of Classification Search
CPC . G06F 16/254; G06F 16/2379; G06F 16/2455
See application file for complete search history.

(56) References Cited

U.S. PATENT DOCUMENTS

| 9,158,846 | B2* | 10/2015 | Radlinski | G06F 16/951 |
| 2010/0211609 | A1* | 8/2010 | Xiong | G06F 16/3344 |
| | | | | 707/E17.001 |
| 2021/0081902 | A1* | 3/2021 | Pena | G06Q 10/1095 |
| 2023/0325599 | A1* | 10/2023 | Nezami | G06N 3/006 |

OTHER PUBLICATIONS

Goyal, Monika, "Applications of Data Mining in Higher Education," IJCSI Intl Journal of Computer Science Issues, vol. 9 Issue 2, Mar. 2012. (Year: 2012).*

* cited by examiner

*Primary Examiner* — Bruce M Moser
(74) *Attorney, Agent, or Firm* — Fountainhead Law Group P.C.

(57) ABSTRACT

Some embodiments provide a non-transitory machine-readable medium that stores a program. The program may receive a request to extract data for a first entity type. The program may, in response to the request, determine a subset of a plurality of data extraction configurations associated with the first entity type. The program may, for each data extraction configuration in the subset of the plurality of data extraction configurations, process the data extraction configuration based on a set of transaction data to generate a set of data, the set of data comprising a first set of data included in a set of instances of the first entity type and a second set of data included in a set of instances of a second entity type.

20 Claims, 8 Drawing Sheets

EXTRACTING DATA BASED ON DATA EXTRACTION CONFIGURATIONS

BACKGROUND

Extract, transform, load (ETL) is a technique used to retrieve data from one or more data sources, perform some processing on the data, and then storing the processed data in a data storage (e.g., a data warehouse). Examples of types of processing performed on the data retrieves from the data sources include cleansing data, merging data, removing duplicate data, converting data into different formats, etc. After the processed data is stored in the data storage, it can be used for a variety of purposes. For instance, the data in the data storage can be queried, further processed, analyzed, etc.

SUMMARY

In some embodiments, the techniques described herein relate to a non-transitory machine-readable medium storing a program executable by at least one processing unit of a device, the program including sets of instructions for: receiving a request to extract data for a first entity type; in response to the request, determining a subset of a plurality of data extraction configurations associated with the first entity type; and for each data extraction configuration in the subset of the plurality of data extraction configurations, processing the data extraction configuration based on a set of transaction data to generate a set of data, the set of data including a first set of data included in a set of instances of the first entity type and a second set of data included in a set of instances of a second entity type.

In some embodiments, the techniques described herein relate to a non-transitory machine-readable medium, wherein a particular data extraction configuration in the subset of the plurality of data extraction configurations specifies a set of data sources.

In some embodiments, the techniques described herein relate to a non-transitory machine-readable medium, wherein a data source in the set of data sources of the particular data extraction configuration specifies the first entity type is a root entity type and the second entity type is a non-root entity type.

In some embodiments, the techniques described herein relate to a non-transitory machine-readable medium, wherein processing the particular data extraction configuration based on the set of transaction data to generate the set of data includes: loading a third set of data included in the set of instances of the first entity type into a data view; loading a fourth set of data included in the set of instances of the second entity type in the data view; generating a query on the data view; and executing the query.

In some embodiments, the techniques described herein relate to a non-transitory machine-readable medium, wherein processing the particular data extraction configuration based on the set of transaction data to generate the set of data includes identifying the set of instances of the first entity type in the set of transaction data, wherein each instance in the set of instances of the first entity type has a transaction date that falls within a defined range of time.

In some embodiments, the techniques described herein relate to a non-transitory machine-readable medium, wherein a data source in the set of data sources of the particular data extraction configuration further specifies a parent entity type and a set of child entity types, wherein each child entity type in the set of child entity types has a set of attributes in common with the parent entity type, wherein the data sources of the particular data extraction configuration further specifies the first entity type as the parent entity or a child entity type in the set of child entity types.

In some embodiments, the techniques described herein relate to a non-transitory machine-readable medium, wherein the set of transaction data is received from a set of applications that performed a set of transactions, wherein the set of transaction data is associated with the set of transactions performed by the set of applications.

In some embodiments, the techniques described herein relate to a method including: receiving a request to extract data for a first entity type; in response to the request, determining a subset of a plurality of data extraction configurations associated with the first entity type; and for each data extraction configuration in the subset of the plurality of data extraction configurations, processing the data extraction configuration based on a set of transaction data to generate a set of data, the set of data including a first set of data included in a set of instances of the first entity type and a second set of data included in a set of instances of a second entity type.

In some embodiments, the techniques described herein relate to a method, wherein a particular data extraction configuration in the subset of the plurality of data extraction configurations specifies a set of data sources.

In some embodiments, the techniques described herein relate to a method, wherein a data source in the set of data sources of the particular data extraction configuration specifies the first entity type is a root entity type and the second entity type is a non-root entity type.

In some embodiments, the techniques described herein relate to a method, wherein processing the particular data extraction configuration based on the set of transaction data to generate the set of data includes: loading a third set of data included in the set of instances of the first entity type into a data view; loading a fourth set of data included in the set of instances of the second entity type in the data view; generating a query on the data view; and executing the query.

In some embodiments, the techniques described herein relate to a method, wherein processing the particular data extraction configuration based on the set of transaction data to generate the set of data includes identifying the set of instances of the first entity type in the set of transaction data, wherein each instance in the set of instances of the first entity type has a transaction date that falls within a defined range of time.

In some embodiments, the techniques described herein relate to a method, wherein a data source in the set of data sources of the particular data extraction configuration further specifies a parent entity type and a set of child entity types, wherein each child entity type in the set of child entity types has a set of attributes in common with the parent entity type, wherein the data sources of the particular data extraction configuration further specifies the first entity type as the parent entity or a child entity type in the set of child entity types.

In some embodiments, the techniques described herein relate to a method, wherein the set of transaction data is received from a set of applications that performed a set of transactions, wherein the set of transaction data is associated with the set of transactions performed by the set of applications.

In some embodiments, the techniques described herein relate to a system including: a set of processing units; and a non-transitory machine-readable medium storing instructions that when executed by at least one processing unit in the set of processing units cause the at least one processing unit to: receive a request to extract data for a first entity type; in response to the request, determine a subset of a plurality of data extraction configurations associated with the first entity type; and for each data extraction configuration in the subset of the plurality of data extraction configurations, process the data extraction configuration based on a set of transaction data to generate a set of data, the set of data including a first set of data included in a set of instances of the first entity type and a second set of data included in a set of instances of a second entity type.

In some embodiments, the techniques described herein relate to a system, wherein a particular data extraction configuration in the subset of the plurality of data extraction configurations specifies a set of data sources.

In some embodiments, the techniques described herein relate to a system, wherein a data source in the set of data sources of the particular data extraction configuration specifies the first entity type is a root entity type and the second entity type is a non-root entity type.

In some embodiments, the techniques described herein relate to a system, wherein processing the particular data extraction configuration based on the set of transaction data to generate the set of data includes: loading a third set of data included in the set of instances of the first entity type into a data view; loading a fourth set of data included in the set of instances of the second entity type in the data view; generating a query on the data view; and executing the query.

In some embodiments, the techniques described herein relate to a system, wherein processing the particular data extraction configuration based on the set of transaction data to generate the set of data includes identifying the set of instances of the first entity type in the set of transaction data, wherein each instance in the set of instances of the first entity type has a transaction date that falls within a defined range of time.

In some embodiments, the techniques described herein relate to a system, wherein a data source in the set of data sources of the particular data extraction configuration further specifies a parent entity type and a set of child entity types, wherein each child entity type in the set of child entity types has a set of attributes in common with the parent entity type, wherein the data sources of the particular data extraction configuration further specifies the first entity type as the parent entity or a child entity type in the set of child entity types.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for extracting data based on data extraction configurations. In some embodiments, a data processing system receives transaction data from several different applications. The transaction data is associated with transactions performed by the applications. In some cases, the data processing system receives a request to extract data for a particular entity type. In response to the request, the data processing system determines a set of data extraction configurations that are associated with the particular entity type. Each data extraction configuration in the set of data extraction configurations can specify that the particular entity type is a root entity type. Next, the data processing system processes the set of data extraction configurations based on the transaction data. Each data extraction configuration in the set of data extraction configurations that the data processing system processes based on the transaction data produces a set of data that includes instances of the particular entity type as well as data associated with other entity types. The data processing system stores these sets of data in a storage so that the data can be further processed and/or analyzed.

Figure 1:
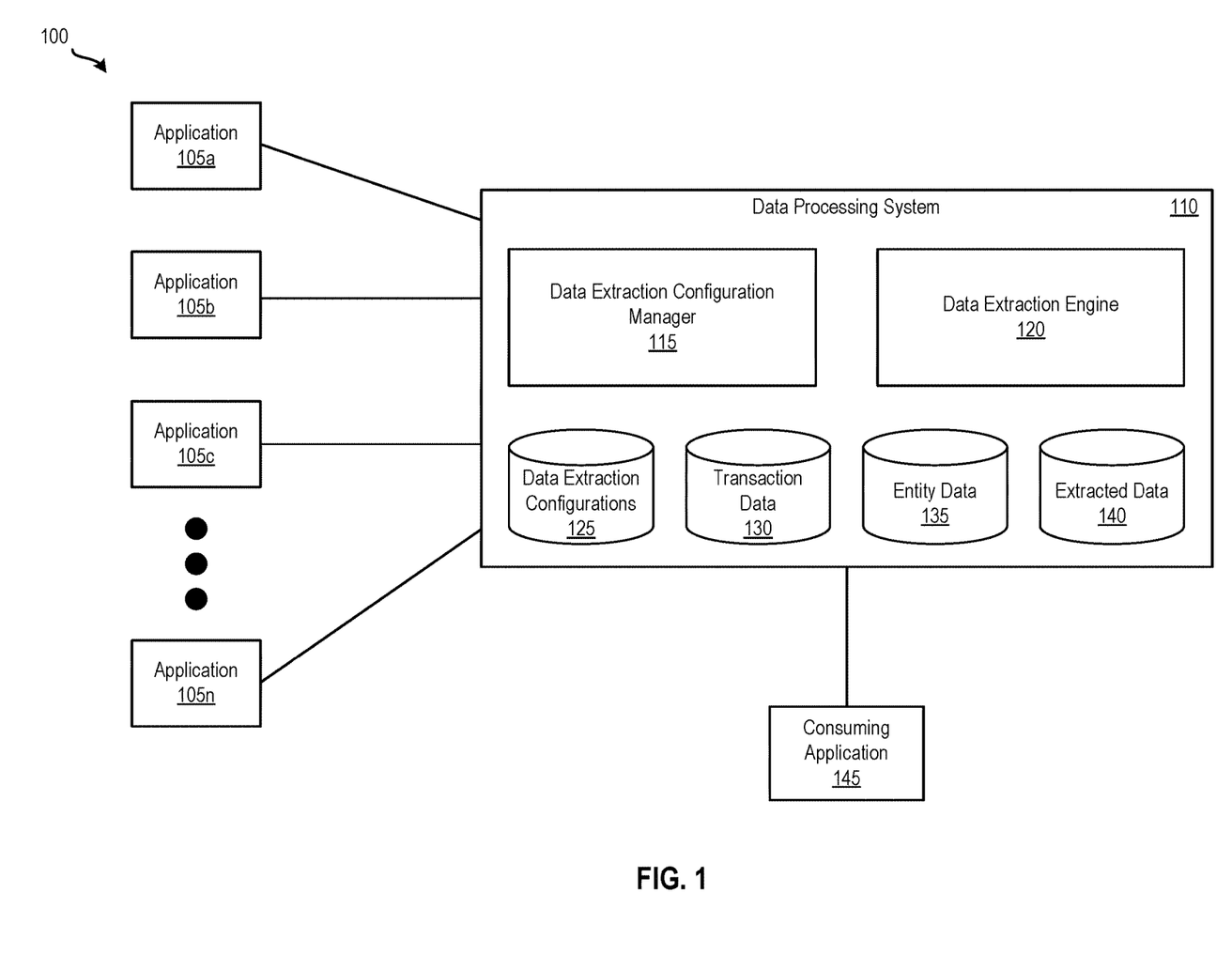
FIG. 1 illustrates a system for extracting data based on data extraction configurations according to some embodiments.

FIG. 1 illustrates a system 100 for extracting data based on data extraction configurations according to some embodiments. As shown, system 100 includes applications 105a-n, data processing system 110, and consuming application 145. Each of the applications 105a-n is a software application that can perform any number of transactions with respect to entity types. Examples of such transactions include creating an instance of an entity type, modifying an instance of an entity type, deleting an instance of an entity type, etc. When an application 105 performs a transaction associated with an entity type, the application 105 sends data processing system 110 a notification indicating that the transaction was performed and a timestamp of when the transaction occurred. In some embodiments, one or more of the applications 105a-n operates on data processing system 110. In other embodiments, one or more of the applications 105a-n operate on a computing device separate from data processing system 110.

As depicted in FIG. 1, data processing system 110 includes data extraction configuration manager 115, data extraction engine 120, and storages 125-140. While FIG. 1 shows data extraction configuration manager 115 and data extraction engine 120 as separate components, in some embodiments, data extraction configuration manager 115 and data extraction engine 120 may be implemented as a single component. Data extraction configurations storage 125 stores data extraction configurations. Transaction data storage 130 is configured to store transaction data received from applications 105a-n. Entity data storage 135 is stores data associated with entities. Examples of such data include instances of entity types. In some embodiments, an entity type is a blueprint for the entity type and specifies a set of attributes. In some such embodiments, an instance of an entity type is a data structure generated based on the entity type and includes a set of values for the set of attributes specified in the entity type. An instance of an entity type may also be referred to as an entity object. Extracted data storage 140 is configured to store data extracted from transaction data and entity data.

In some embodiments, storages 125-140 are implemented in a single physical storage while, in other embodiments, storages 125-140 may be implemented across several physical storages. While FIG. 1 shows data extraction configurations storage 125, transaction data storage 130, entity data storage 135, and extracted data storage 140 as part of data processing system 110, one of ordinary skill in the art will appreciate that data extraction configurations storage 125, transaction data storage 130, entity data storage 135, and/or extracted data storage 140 may be external to data processing system 110 in some embodiments.

Data extraction configuration manager 115 is responsible for managing data extraction configurations. For example, data extraction configuration manager 115 may receive (e.g., from a client device interacting with data processing system 110, a user of data processing system 110, etc.) a data extraction configuration. In response, data extraction configuration manager 115 stores the data extraction configuration in data extraction configurations storage 125. As another example, data extraction configuration manager 115 can receive (e.g., from a client device interacting with data processing system 110, a user of data processing system 110, etc.) a request to extract data for a particular entity type. In response to such a request, data extraction configuration manager 115 accesses data extraction configurations storage 125 to determine a set of data extraction configurations that are associated with the particular entity type. Then, data extraction configuration manager 115 retrieves the set of data extraction configurations from data extraction configurations storage 125 and sends data extraction engine 120 the set of data extraction configurations and a request to process them for the particular entity type. In some embodiments, data extraction configuration manager 115 can be configured to initiate, at defined intervals (e.g., once every five minutes, once every fifteen minutes, once an hour, etc.), data extraction for a set of entity types by determining the data extraction configurations associated with the set of entity types and sending data extraction engine 120 the determined data extraction configurations and a request to process them for the set of entity types.

Data extraction engine 120 handles the processing of data extraction configurations for entity types. For instance, data extraction engine 120 may receive from data extraction configuration manager 115 a set of data extraction configurations and a particular entity type. In response, data extraction engine 120 processes the set of data extraction configurations based on the transaction data stored in transaction data storage 130 in order to generate a set of data. The generated data can be referred to as a data extraction object (DEO). A DEO may include some or all of the data included in one or more instances of the particular entity object in transaction data storage 130. In some instances, a DEO may also include data associated with instances of one or more entity types stored in entity data storage 135. After data extraction engine 120 generates the DEOs for the set of data extraction configurations associated with the particular entity type, data extraction engine 120 stores them in extracted data storage 140.

Consuming application 145 is a software application configured to process and analyze extracted data. For example, consuming application 145 can access extracted data storage 140 and retrieve extracted data (e.g., DEOs). Then, consuming application 145 may process and/or analyze the retrieved extracted data. In some embodiments, consuming application 145 operates on data processing system 110. In other embodiments, consuming application 145 operates on a computing device separate from data processing system 110.

Figure 2:
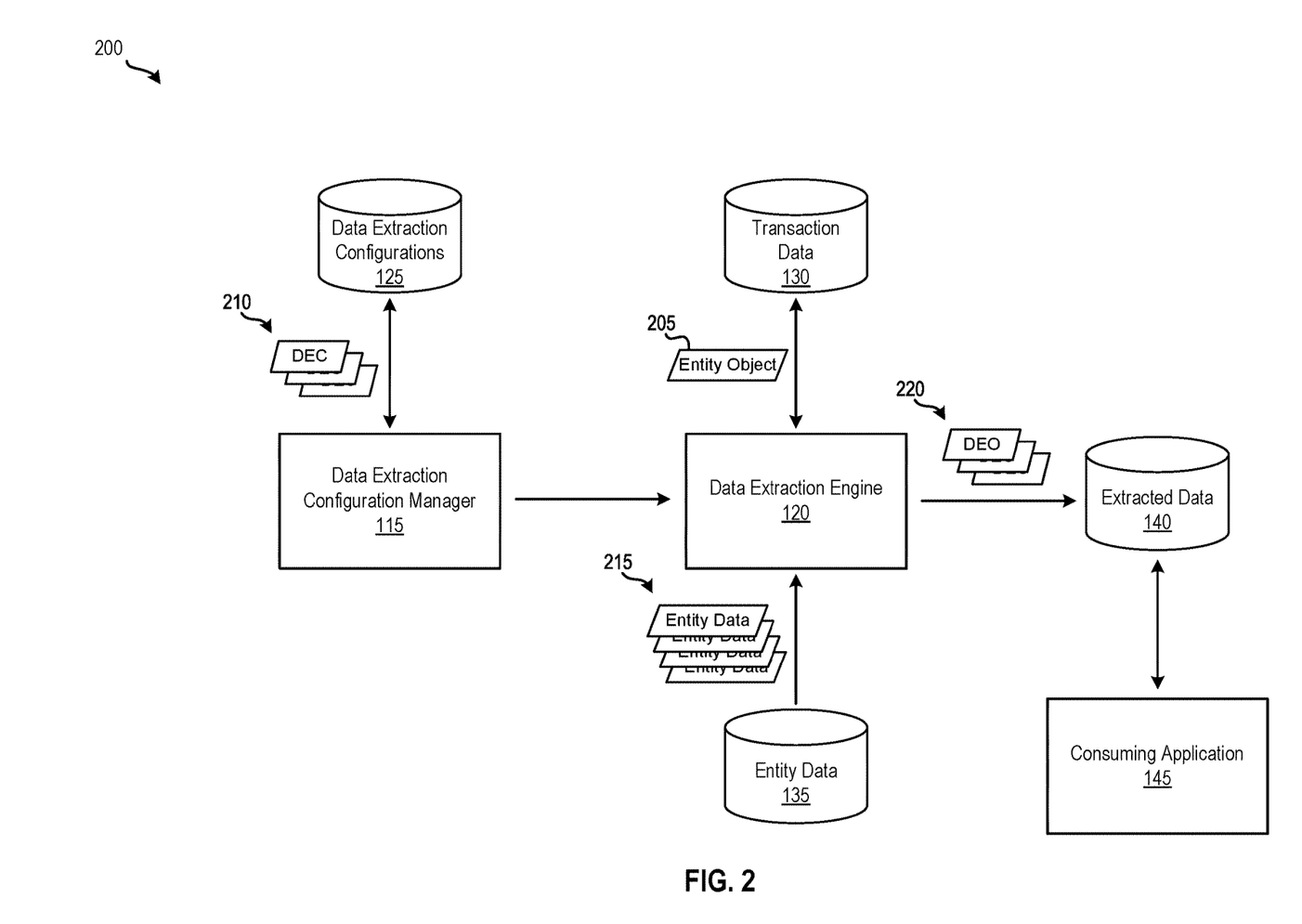
FIG. 2 illustrates an example data flow through the system illustrated in FIG. 1 according to some embodiments.

FIG. 2 illustrates an example data flow 200 through system 100 according to some embodiments. Specifically, the example data flow 200 shows how data is extracted from transaction data and entity data based on data extraction configurations. Data flow 200 starts by data extraction configuration manager 115 receiving (e.g., from a client device interacting with data processing system 110, a user of data processing system 110, etc.) a request to extract data for a particular entity type. In response to the request, data extraction configuration manager 115 accesses data extraction configurations storage 125 and determines a set of data extraction configurations 210 associated with the particular entity type. Data extraction configuration manager 115 then sends data extraction engine 120 the set of data extraction configurations 210 and a request to process the set of data extraction configurations 210 for the particular entity type.

Upon receiving the set of data extraction configurations 210 and the request to process them for the particular entity type, data extraction engine 120 processes each data extraction configuration in the set of data extraction configurations 210 for the particular entity type. In this example, data extraction engine 120 processes each data extraction configuration in the set of data extraction configurations 210 based on transaction data stored in transaction data storage 130 and entity data stored in entity data storage 135. In particular, when processing each data extraction configuration, data extraction engine 120 accesses transaction data storage 130 and identifies an instance of the particular entity type, referred to as entity object 205 in FIG. 2, from the transaction data stored in transaction data storage 130. Next, based on the data extraction configuration, data extraction engine 120 accesses entity data storage 135 and identifies a set of entity data 215 associated with instances of one or more entity types stored in entity data storage 135. Based on the data extraction configuration, data extraction engine 120 generates a set of data, which is depicted as a DEO 220. The set of data includes a set of attributes from entity object 205 and a set of attributes from the set of entity data 215.

As shown in FIG. 2, data extraction engine 120 generates three DEOs 220; one for each data extraction configuration in the set of data extraction configurations 210. Data extraction engine 120 stores the set of DEOs 220 in extracted data storage 140. Once the set of DEOs 220 are stored in extracted data storage 140, they can be accessed at a later time. For this example, consuming application 145 accesses extracted data storage 140 and retrieves the set of DEOs 220 for further processing and/or analysis.

Figure 3A:
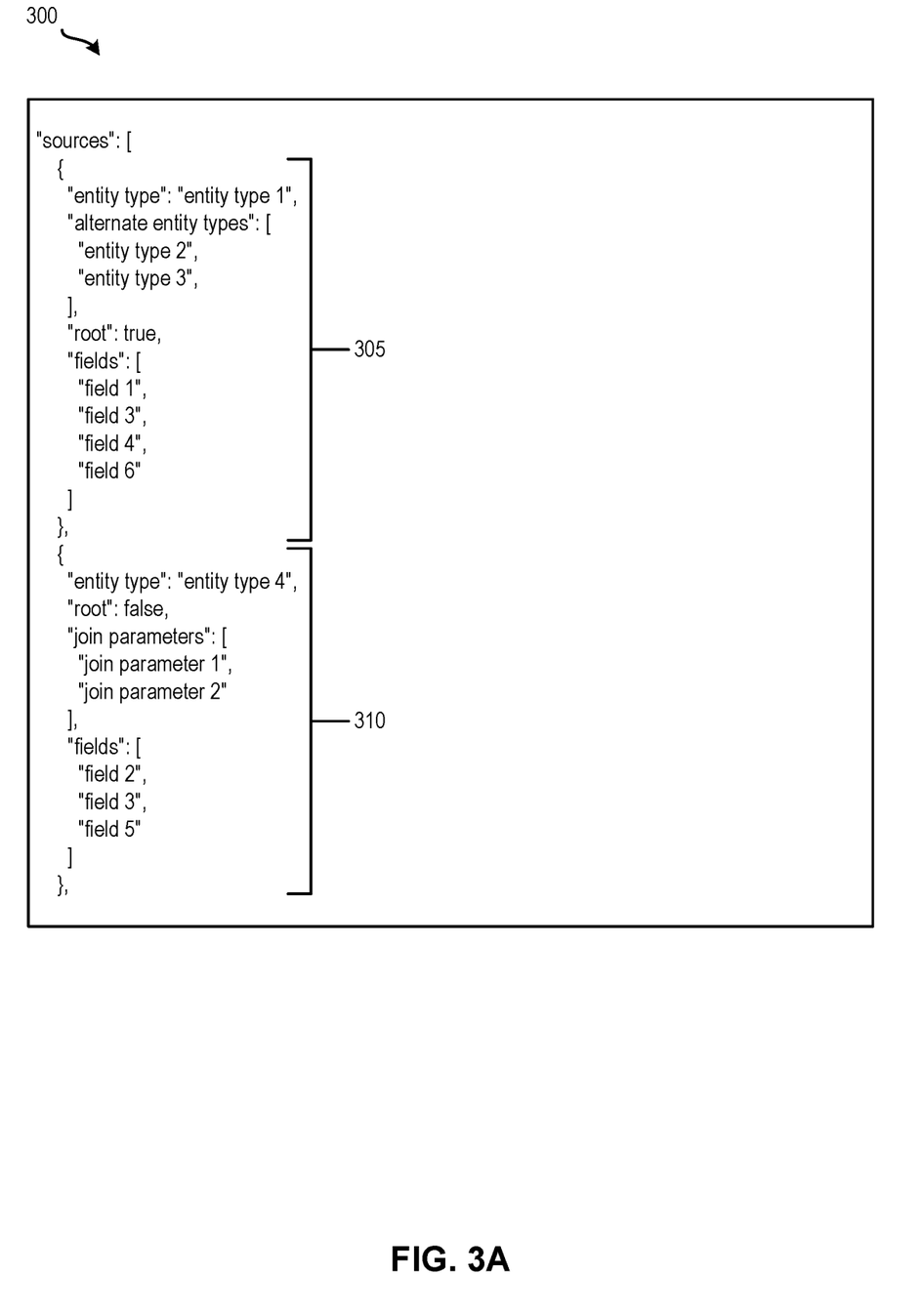
FIGS. 3A and 3B illustrate an example data extraction configuration according to some embodiments.
Figure 3B:
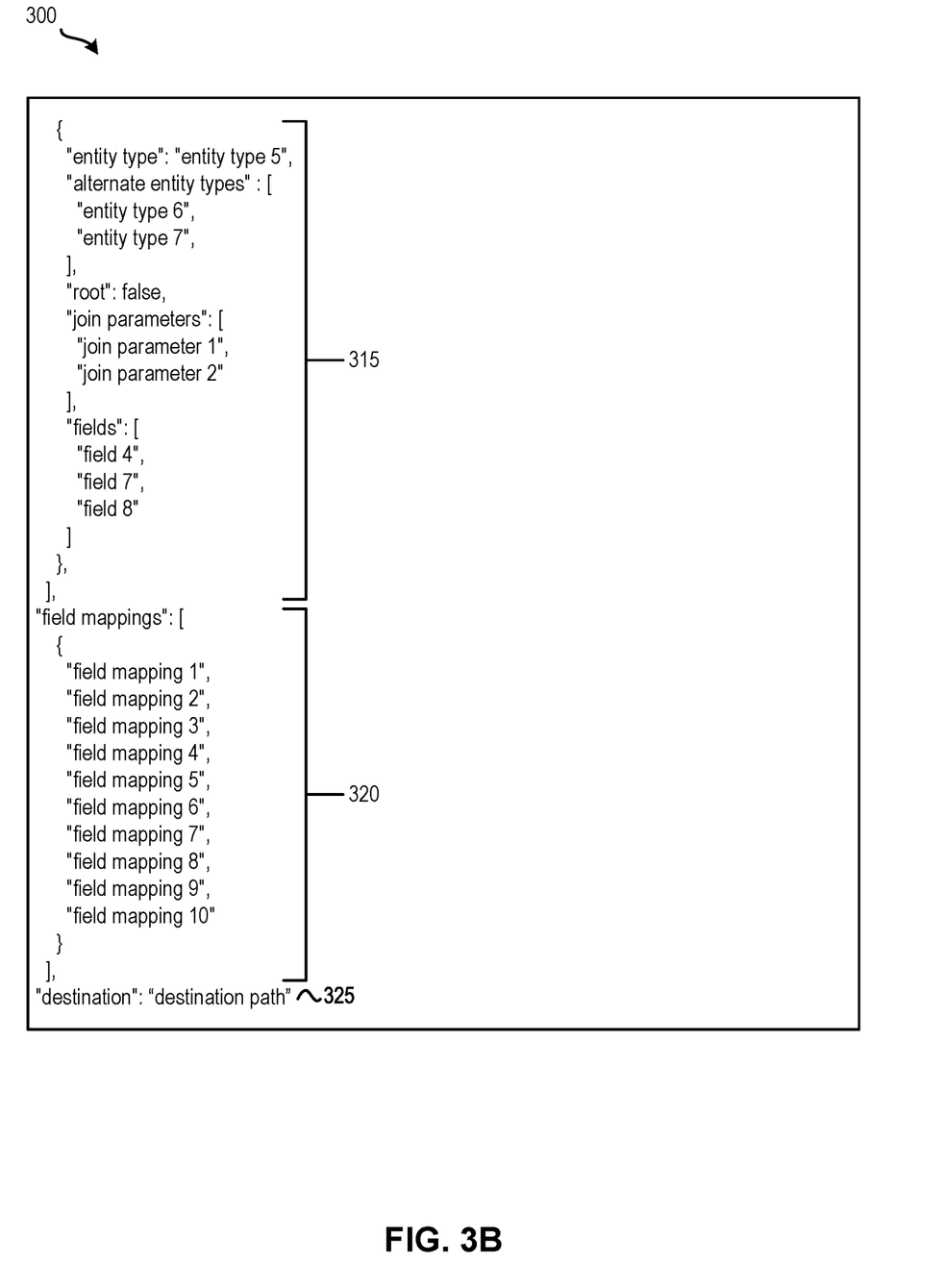

FIGS. 3A and 3B illustrate an example data extraction configuration 300 according to some embodiments. Specifically, FIG. 3A illustrates a top portion of data extraction configuration 300. As shown in FIG. 3A, data extraction configuration 300 specifies data sources 305 and 310. Data source 305 specifies an entity type of "entity type 1," a set of alternate entity types "entity type 2" and "entity type 3," a root entity type "true," and a set of fields "field 1," "field 3," "field 4," and "field 6." When a data source specifies an entity type as well as alternate entity types, the entity type specified in a data source may referred to as a parent entity type and an alternative entity type may be referred to as a child entity type. In some embodiments, an alternative entity type has, among other attributes, a set of attributes in common with the parent entity type. In some cases, data extraction engine 120 determines a data extraction configuration as being associated with a particular entity type if a data source specifies a root entity type as being "true" and an entity type or an alternate entity type that matches the particular entity type. For example, data extraction engine 120 determines that data extraction configuration 300 is associated with a particular entity type if the particular entity type is "entity type 1," "entity type 2," or "entity type 3." The set of fields specified in data source 305 are the attributes of the entity type that are to be extracted.

Data source 310 specifies an entity type of "entity type 4," a root entity type "false," a set of join parameters "join parameter 1" and "join parameter 2," and a set of fields "field 2," "field 3," and "field 5." For example, data extraction engine 120 determines that data extraction configuration 300 is associated with a particular entity type if the particular entity type is "entity type 1," "entity type 2," or "entity type 3." A join parameter specifies a parameter for performing a join operation between data sources. Each of the join parameters specified in data source 310 are parameters for performing a join operation between data sources 305 and 310. Examples of join parameters include a type of join (e.g., an inner join, an outer join, a left join, a right join, etc.), an attribute of an entity type specified in the data source on which to perform the join operation, etc. The set of fields specified in data source 310 are the attributes of the entity type that are to be extracted.

FIG. 3B illustrates a bottom portion of data extraction configuration 300. As depicted, data extraction configuration 300 further specifies data source 315, field mappings 320, and destination 325. Data source 315 specifies an entity type of "entity type 5," a set of alternate entity types "entity type 6" and "entity type 7," a root entity type "false," a set of join parameters "join parameter 1" and "join parameter 2," and a set of fields "field 4," "field 7," and "field 8." As mentioned above, when a data source specifies an entity type as well as alternate entity types, the entity type specified in a data source may referred to as a parent entity type and an alternative entity type may be referred to as a child entity type. Additionally, an alternative entity type has, among other attributes, a set of attributes in common with the parent entity type, in some embodiments. Each of the join parameters specified in data source 315 are parameters for performing a join operation between data sources 305 and 315. The set of fields specified in data source 315 are the attributes of the entity type that are to be extracted.

Field mappings 320 specifies a set of field mappings "field mapping 1," "field mapping 2," "field mapping 3," "field mapping 4," "field mapping 5," "field mapping 6," "field mapping 7," "field mapping 8," "field mapping 9," and "field mapping 10." Each of the field mappings specified in field mappings 320 specifies a mapping between an attribute extracted from one of the data sources 305-315 and an attribute in a storage where the extracted attribute is to be stored. The attribute extracted from one of the data sources 305-315 can be referred to as a source attribute and the attribute in the storage can be referred to as a destination attribute. As such, when processing data extraction configuration, a source attribute is stored in destination attribute in the storage. Destination 325 specifies a "destination path" of a storage where extracted attributes are to be stored.

Figure 4:
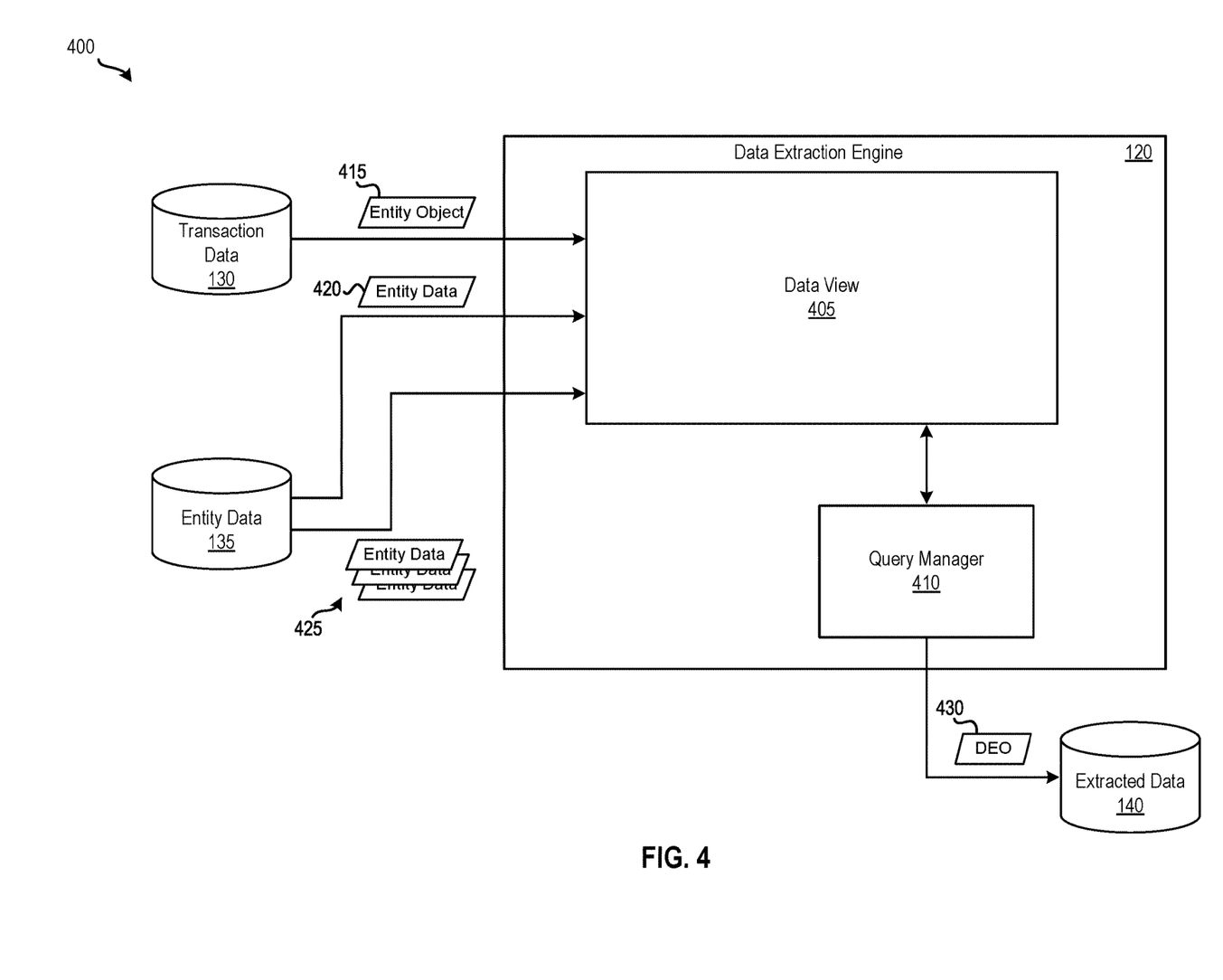
FIG. 4 illustrates an example of processing the example data extraction configuration illustrated in FIGS. 3A and 3B according to some embodiments.

FIG. 4 illustrates an example of processing data extraction configuration 300 according to some embodiments. In particular, FIG. 4 illustrates how data extraction configuration 300 is processed when performing data extraction for "entity type 1." Data extraction engine 120 starts processing data extraction configuration 300 by iterating to the first data source 305 and checking whether data source 305 specifies a root entity type as "true." In this example, data source 305 specifies the root entity type as "true." Accordingly, data extraction engine 120 accessing transaction data storage 130 and identifying instances of "entity type 1" that have a timestamp falling within a defined range of time (e.g., instances of "entity type 1" that data processing system 110 received from applications 105a-n with a timestamp that falls within the defined range of time). For this example, the defined range of time is the time period between the last time data extraction engine 120 performed data extraction for "entity type 1" and the current time. Data extraction engine 120 retrieves these instances of "entity type 1" from transaction data storage 130. Here, data extraction engine 120 retrieves entity object 415, as illustrated in FIG. 4. Data extraction engine 120 then generates data view 405 and loads entity object 415 in data view 405. In some embodiments, data extraction engine 120 flattens the columns of the retrieved data before loading it into data view 405.

Next, data extraction engine 120 iterates to the second data source 310 in data extraction configuration 300 and checks whether data source 310 specifies a root entity type as "true." Here, data source 310 specifies the root entity type as "false" (i.e., data source 310 is a non-root entity type). Thus, data extraction engine 120 determines whether data source 310 specifies any alternate entity types. For this example, data source 310 does not specify any alternate entity types. Therefore, data extraction engine 120 accesses entity data storage 135, retrieves the table that stores instances of "entity type 4," which is represented as entity data 420 in FIG. 4, and loads entity data 420 in data view 405. In some embodiments, data extraction engine 120 flattens the columns of the retrieved data before loading it into data view 405.

Continuing with the example, data extraction engine 120 iterates to the third data source 315 in data extraction configuration 300 and checks whether data source 315 specifies a root entity type as "true." In this example, data source 315 specifies the root entity type as "false" (i.e., data source 310 is a non-root entity type). Hence, data extraction engine 120 determines whether data source 315 specifies any alternate entity types. Here, data source 315 specifies two alternate entity types "entity type 6" and "entity type 7." As such, data extraction engine 120 accesses entity data storage 135, retrieves the tables that store instances of "entity type 5," "entity type 6," and "entity type 7," and performs a union operation on the retrieved data. The retrieved data is represented in FIG. 4 as entity data 425. Then, data extraction engine 120 loads entity data 425 in data view 405. In some embodiments, data extraction engine 120 flattens the columns of the retrieved data before loading it into data view 405.

As depicted in FIG. 4, data extraction engine 120 includes query manager 410, which is configured to manage queries for data extraction engine 120. After data extraction engine 120 finishes loading data into data view 405, query manager 410 generates a query on data view 405 that selects the set of fields specified in data sources 305-315. Then, query manager 410 adds the sets of join parameters specified in data sources 310 and 315 to the query. Next, query manager 410 adds the set of field mappings and destination specified in data extraction configuration 300 to the query. Once the query is generated, query manager 410 executes the query on data view 405. Query manager 410 receives the results of the query in the form of DEO 430, which query manager 410 stores in extracted data storage 140. In some embodiments, query manager 410 may filter the results of the query (e.g., remove bad data, remove duplicate date, etc.) and before storing the filtered results as DEO 430 in extracted data storage 140.

The examples described above by reference to FIGS. 2-4 show data processing system 110 processing data extraction configurations for a particular entity type. In some cases, data processing system 110 can receive (e.g., from a client device interacting with data processing system 110, a user of data processing system 110, etc.) a request to extract data for several different entity types. In some embodiments, data processing system 110 processes the request on an entity type-by-entity type basis. That is, data processing system 110 performs the same or similar techniques described above by reference to FIGS. 2-4 for each entity type specified in the request.

Figure 5:
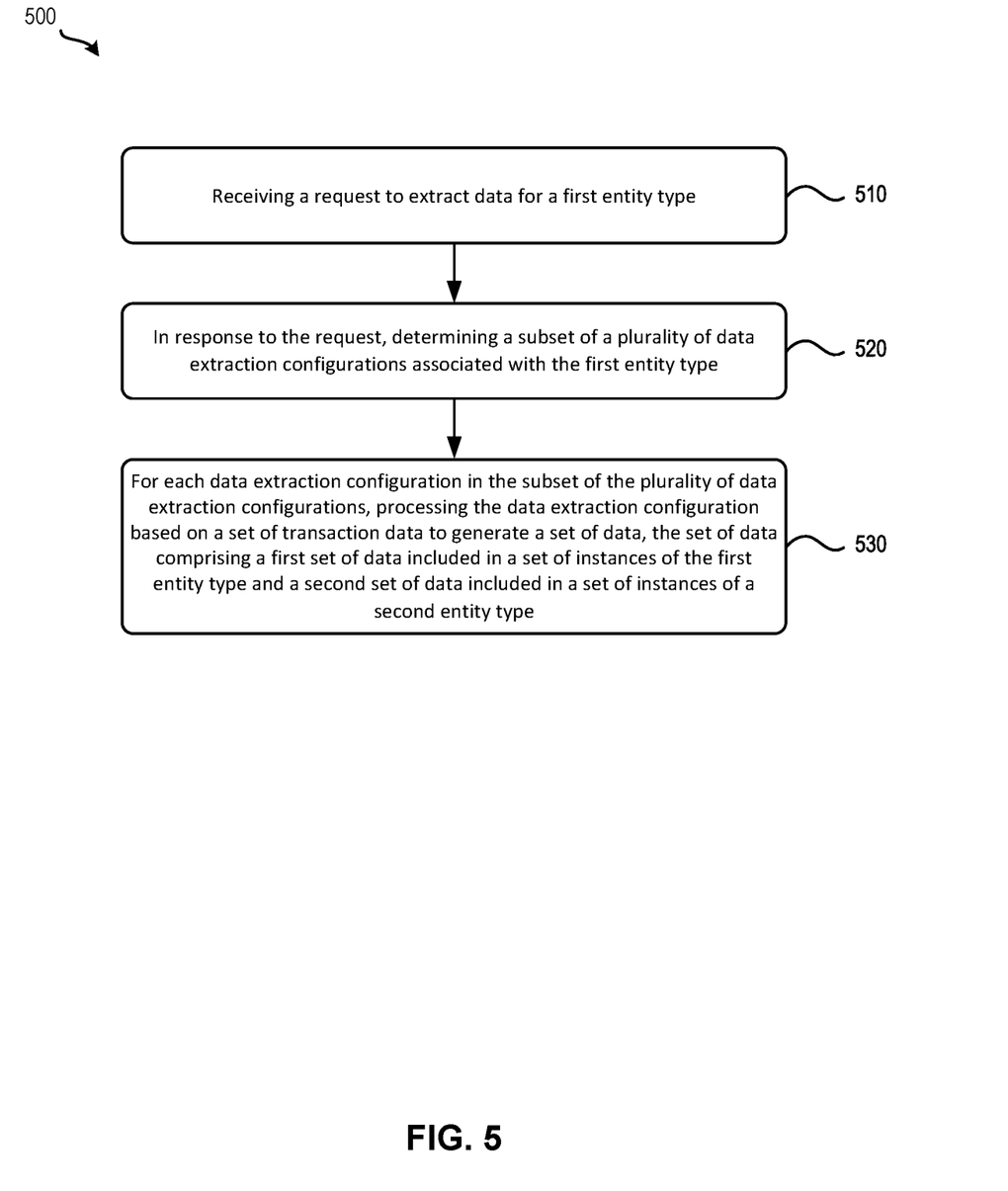
FIG. 5 illustrates a process for extracting data based on data extraction configurations according to some embodiments.

FIG. 5 illustrates a process 500 for extracting data based on data extraction configurations according to some embodiments. In some embodiments, data processing system 110 performs process 500. Process 500 begins by receiving, at 510, a request to extract data for a first entity type. Referring to FIG. 1 as an example, data extraction configuration manager 115 may receive the request to extract data for the first entity type.

In response to the request, process 500 determines, at 520, a subset of a plurality of data extraction configurations associated with the first entity type. Referring to FIG. 2 as an example, data extraction configuration manager 115 can determine the set of data extraction configurations 210, which is a subset of a plurality of data extraction configurations stored in data extraction configurations storage 125.

At 530, for each data extraction configuration in the subset of the plurality of data extraction configurations, process 50 processes the data extraction configuration based on a set of transaction data to generate a set of data. The set of data comprises a first set of data included in a set of instances of the first entity type and a second set of data included in a set of instances of a second entity type. Referring to FIG. 2 as an example, data extraction engine 120 processes each data extraction configuration in the set of data extraction configurations 210 based on the transaction data stored in transaction data storage 130 in order to generate the set of DEOs 220. Each DEO in the set of DEOs 220 includes a set of data included in entity object 205 and a set of data associated with instances of entity types stored in entity data storage 135.

Figure 6:
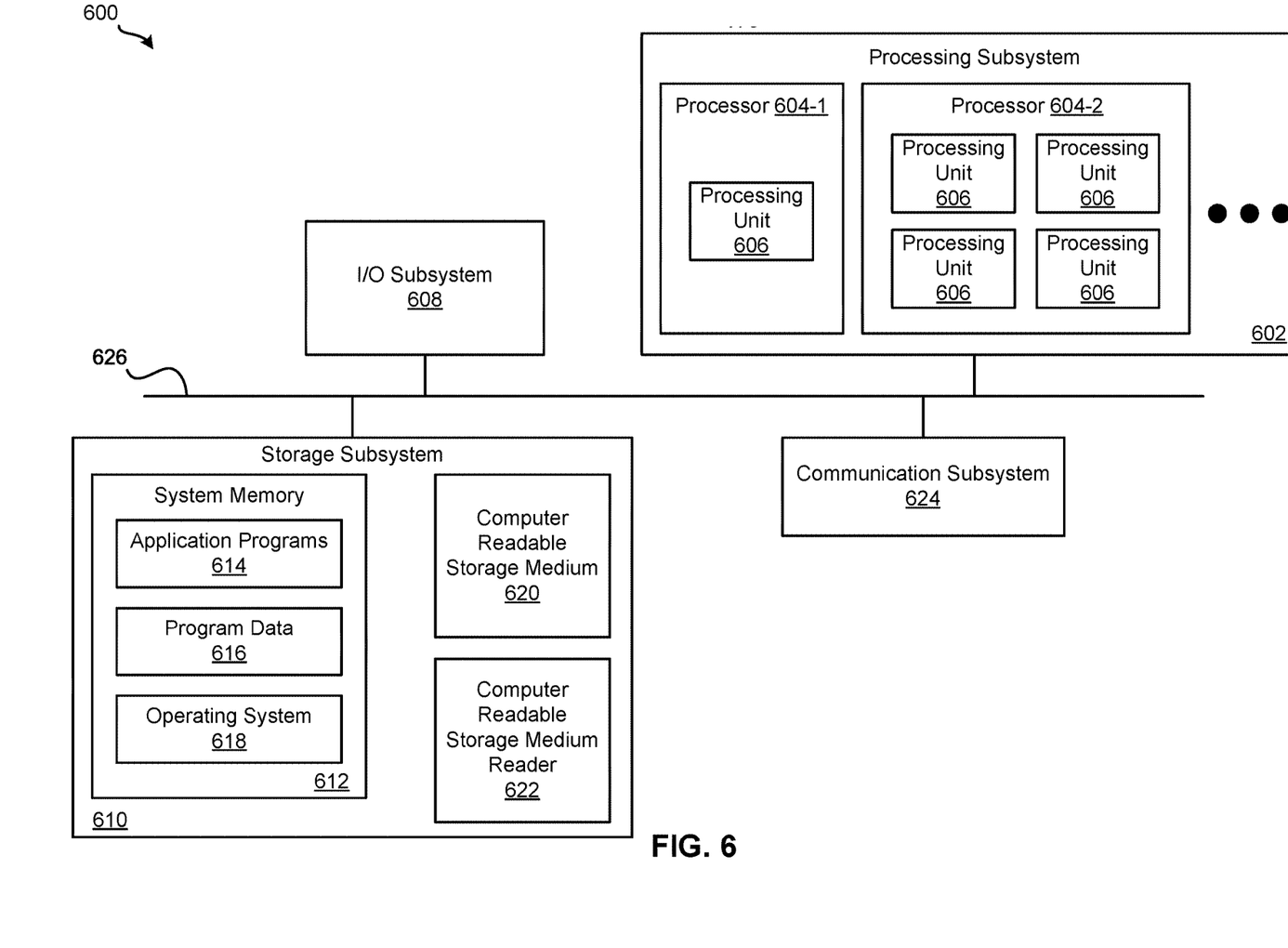
FIG. 6 illustrates an exemplary computer system, in which various embodiments may be implemented.

FIG. 6 illustrates an exemplary computer system 600 for implementing various embodiments described above. For example, computer system 600 may be used to implement data processing system 110. Computer system 600 may be a desktop computer, a laptop, a server computer, or any other type of computer system or combination thereof. Some or all elements of data extraction configuration manager 115, data extraction engine 120, or combinations thereof can be included or implemented in computer system 600. In addition, computer system 600 can implement many of the operations, methods, and/or processes described above (e.g., process 500). As shown in FIG. 6, computer system 600 includes processing subsystem 602, which communicates, via bus subsystem 626, with input/output (I/O) subsystem 608, storage subsystem 610 and communication subsystem 624.

Bus subsystem 626 is configured to facilitate communication among the various components and subsystems of computer system 600. While bus subsystem 626 is illustrated in FIG. 6 as a single bus, one of ordinary skill in the art will understand that bus subsystem 626 may be implemented as multiple buses. Bus subsystem 626 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Extended ISA (EISA) bus, a Video Electronics Standards Association (VESA) local bus, a Peripheral Component Interconnect (PCI) bus, a Universal Serial Bus (USB), etc.

Processing subsystem 602, which can be implemented as one or more integrated circuits (e.g., a conventional microprocessor or microcontroller), controls the operation of computer system 600. Processing subsystem 602 may include one or more processors 604. Each processor 604 may include one processing unit 606 (e.g., a single core processor such as processor 604-1) or several processing units 606 (e.g., a multicore processor such as processor 604-2). In some embodiments, processors 604 of processing subsystem 602 may be implemented as independent processors while, in other embodiments, processors 604 of processing subsystem 602 may be implemented as multiple processors integrate into a single chip or multiple chips. Still, in some embodiments, processors 604 of processing subsystem 602 may be implemented as a combination of independent processors and multiple processors integrated into a single chip or multiple chips.

In some embodiments, processing subsystem 602 can execute a variety of programs or processes in response to program code and can maintain multiple concurrently executing programs or processes. At any given time, some or all of the program code to be executed can reside in processing subsystem 602 and/or in storage subsystem 610. Through suitable programming, processing subsystem 602 can provide various functionalities, such as the functionalities described above by reference to process 500.

I/O subsystem 608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 600 to a user or another device (e.g., a printer).

As illustrated in FIG. 6, storage subsystem 610 includes system memory 612, computer-readable storage medium 620, and computer-readable storage medium reader 622. System memory 612 may be configured to store software in the form of program instructions that are loadable and executable by processing subsystem 602 as well as data generated during the execution of program instructions. In some embodiments, system memory 612 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 612 may include different types of memory, such as static random access memory (SRAM) and/or dynamic random access memory (DRAM). System memory 612 may include a basic input/output system (BIOS), in some embodiments, that is configured to store basic routines to facilitate transferring information between elements within computer system 600 (e.g., during start-up). Such a BIOS may be stored in ROM (e.g., a ROM chip), flash memory, or any other type of memory that may be configured to store the BIOS.

As shown in FIG. 6, system memory 612 includes application programs 614, program data 616, and operating system (OS) 618. OS 618 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 620 may be a non-transitory computer-readable medium configured to store software (e.g., programs, code modules, data constructs, instructions, etc.). Many of the components (e.g., configuration manager 115 and data extraction engine 120) and/or processes (e.g., process 500) described above may be implemented as software that when executed by a processor or processing unit (e.g., a processor or processing unit of processing subsystem 602) performs the operations of such components and/or processes. Storage subsystem 610 may also store data used for, or generated during, the execution of the software.

Storage subsystem 610 may also include computer-readable storage medium reader 622 that is configured to communicate with computer-readable storage medium 620. Together and, optionally, in combination with system memory 612, computer-readable storage medium 620 may comprehensively represent remote, local, fixed, and/or removable storage devices plus storage media for temporarily and/or more permanently containing, storing, transmitting, and retrieving computer-readable information.

Computer-readable storage medium 620 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSDs), flash memory card (e.g., secure digital (SD) cards, CompactFlash cards, etc.), USB flash drives, or any other type of computer-readable storage media or device.

Communication subsystem 624 serves as an interface for receiving data from, and transmitting data to, other devices, computer systems, and networks. For example, communication subsystem 624 may allow computer system 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 624 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 624 may provide components configured for wired communication (e.g., Ethernet) in addition to or instead of components configured for wireless communication.

One of ordinary skill in the art will realize that the architecture shown in FIG. 6 is only an example architecture of computer system 600, and that computer system 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
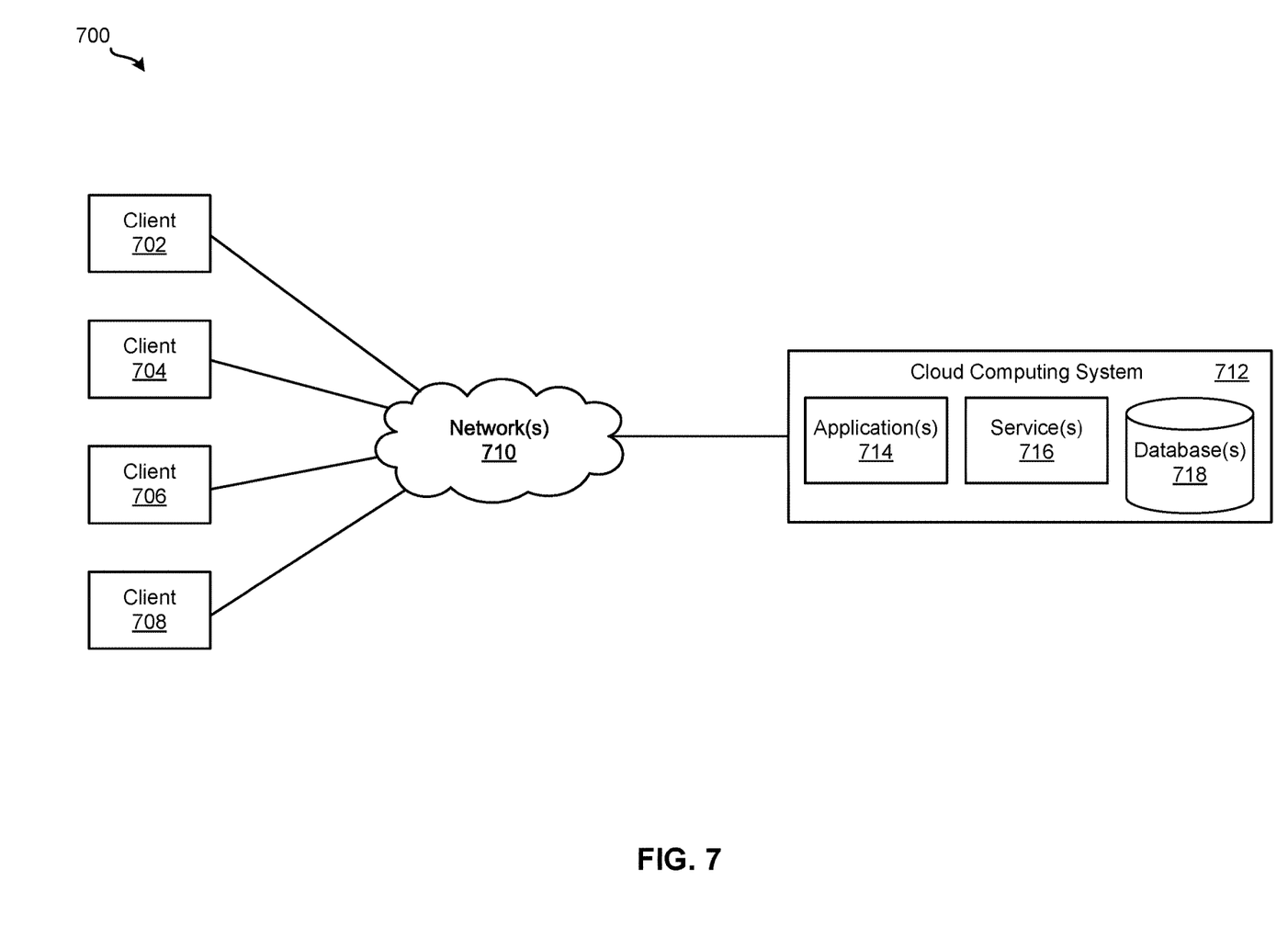
FIG. 7 illustrates an exemplary system, in which various embodiments may be implemented.

FIG. 7 illustrates an exemplary system 700 for implementing various embodiments described above. For example, cloud computing system 712 may be used to implement data processing system 110. As shown, system 700 includes client devices 702-708, one or more networks 710, and cloud computing system 712. Cloud computing system 712 is configured to provide resources and data to client devices 702-708 via networks 710. In some embodiments, cloud computing system 712 provides resources to any number of different users (e.g., customers, tenants, organizations, etc.). Cloud computing system 712 may be implemented by one or more computer systems (e.g., servers), virtual machines operating on a computer system, or a combination thereof.

As shown, cloud computing system 712 includes one or more applications 714, one or more services 716, and one or more databases 718. Cloud computing system 712 may provide applications 714, services 716, and databases 718 to any number of different customers in a self-service, subscription-based, elastically scalable, reliable, highly available, and secure manner.

In some embodiments, cloud computing system 712 may be adapted to automatically provision, manage, and track a customer's subscriptions to services offered by cloud computing system 712. Cloud computing system 712 may provide cloud services via different deployment models. For example, cloud services may be provided under a public cloud model in which cloud computing system 712 is owned by an organization selling cloud services and the cloud services are made available to the general public or different industry enterprises. As another example, cloud services may be provided under a private cloud model in which cloud computing system 712 is operated solely for a single organization and may provide cloud services for one or more entities within the organization. The cloud services may also be provided under a community cloud model in which cloud computing system 712 and the cloud services provided by cloud computing system 712 are shared by several organizations in a related community. The cloud services may also be provided under a hybrid cloud model, which is a combination of two or more of the aforementioned different models.

In some instances, any one of applications 714, services 716, and databases 718 made available to client devices 702-708 via networks 710 from cloud computing system 712 is referred to as a "cloud service." Typically, servers and systems that make up cloud computing system 712 are different from the on-premises servers and systems of a customer. For example, cloud computing system 712 may host an application and a user of one of client devices 702-708 may order and use the application via networks 710.

Applications 714 may include software applications that are configured to execute on cloud computing system 712 (e.g., a computer system or a virtual machine operating on a computer system) and be accessed, controlled, managed, etc. via client devices 702-708. In some embodiments, applications 714 may include server applications and/or mid-tier applications (e.g., HTTP (hypertext transfer protocol) server applications, FTP (file transfer protocol) server applications, CGI (common gateway interface) server applications, JAVA server applications, etc.). Services 716 are software components, modules, application, etc. that are configured to execute on cloud computing system 712 and provide functionalities to client devices 702-708 via networks 710. Services 716 may be web-based services or on-demand cloud services.

Databases 718 are configured to store and/or manage data that is accessed by applications 714, services 716, and/or client devices 702-708. For instance, storages 125-140 may be stored in databases 718. Databases 718 may reside on a non-transitory storage medium local to (and/or resident in) cloud computing system 712, in a storage-area network (SAN), on a non-transitory storage medium local located remotely from cloud computing system 712. In some embodiments, databases 718 may include relational databases that are managed by a relational database management system (RDBMS). Databases 718 may be a column-oriented databases, row-oriented databases, or a combination thereof. In some embodiments, some or all of databases 718 are in-memory databases. That is, in some such embodiments, data for databases 718 are stored and managed in memory (e.g., random access memory (RAM)).

Client devices 702-708 are configured to execute and operate a client application (e.g., a web browser, a proprietary client application, etc.) that communicates with applications 714, services 716, and/or databases 718 via networks 710. This way, client devices 702-708 may access the various functionalities provided by applications 714, services 716, and databases 718 while applications 714, services 716, and databases 718 are operating (e.g., hosted) on cloud computing system 712. Client devices 702-708 may be computer system 600, as described above by reference to FIG. 6. Although system 700 is shown with four client devices, any number of client devices may be supported.

Networks 710 may be any type of network configured to facilitate data communications among client devices 702-708 and cloud computing system 712 using any of a variety of network protocols. Networks 710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
receiving a request to extract data for a first entity type;
in response to the request, determining a subset of a plurality of data extraction configurations associated with the first entity type; and
for each data extraction configuration in the subset of the plurality of data extraction configurations, processing the data extraction configuration based on a set of transaction data to generate a set of data, the set of data comprising a first set of data included in a set of instances of the first entity type and a second set of data included in a set of instances of a second entity type,
wherein the set of transaction data is received from a set of applications that performed a set of transactions, wherein the set of transaction data is associated with the set of transactions performed by the set of applications.

2. The non-transitory machine-readable medium of claim 1, wherein a particular data extraction configuration in the subset of the plurality of data extraction configurations specifies a set of data sources.

3. The non-transitory machine-readable medium of claim 2, wherein a data source in the set of data sources of the particular data extraction configuration specifies the first entity type is a root entity type and the second entity type is a non-root entity type.

4. The non-transitory machine-readable medium of claim 3, wherein processing the particular data extraction configuration based on the set of transaction data to generate the set of data comprises:
loading a third set of data included in the set of instances of the first entity type into a data view;
loading a fourth set of data included in the set of instances of the second entity type in the data view;
generating a query on the data view; and
executing the query.

5. The non-transitory machine-readable medium of claim 3, wherein processing the particular data extraction configuration based on the set of transaction data to generate the set of data comprises identifying the set of instances of the first entity type in the set of transaction data, wherein each instance in the set of instances of the first entity type has a transaction date that falls within a defined range of time.

6. The non-transitory machine-readable medium of claim 2, wherein a data source in the set of data sources of the particular data extraction configuration further specifies a parent entity type and a set of child entity types, wherein each child entity type in the set of child entity types has a set of attributes in common with the parent entity type, wherein the data sources of the particular data extraction configuration further specifies the first entity type as the parent entity or a child entity type in the set of child entity types.

7. The non-transitory machine-readable medium of claim 1, wherein a particular data extraction configuration in the subset of the plurality of data extraction configurations specifies a set of fields of the first entity type to extract.

8. A method comprising:
receiving a request to extract data for a first entity type;
in response to the request, determining a subset of a plurality of data extraction configurations associated with the first entity type; and
for each data extraction configuration in the subset of the plurality of data extraction configurations, processing the data extraction configuration based on a set of transaction data to generate a set of data, the set of data comprising a first set of data included in a set of instances of the first entity type and a second set of data included in a set of instances of a second entity type,
wherein the set of transaction data is received from a set of applications that performed a set of transactions, wherein the set of transaction data is associated with the set of transactions performed by the set of applications.

9. The method of claim 8, wherein a particular data extraction configuration in the subset of the plurality of data extraction configurations specifies a set of data sources.

10. The method of claim 9, wherein a data source in the set of data sources of the particular data extraction configuration specifies the first entity type is a root entity type and the second entity type is a non-root entity type.

11. The method of claim 10, wherein processing the particular data extraction configuration based on the set of transaction data to generate the set of data comprises:
loading a third set of data included in the set of instances of the first entity type into a data view;
loading a fourth set of data included in the set of instances of the second entity type in the data view;
generating a query on the data view; and
executing the query.

12. The method of claim 10, wherein processing the particular data extraction configuration based on the set of transaction data to generate the set of data comprises identifying the set of instances of the first entity type in the set of transaction data, wherein each instance in the set of instances of the first entity type has a transaction date that falls within a defined range of time.

13. The method of claim 9, wherein a data source in the set of data sources of the particular data extraction configuration further specifies a parent entity type and a set of child entity types, wherein each child entity type in the set of child entity types has a set of attributes in common with the parent entity type, wherein the data sources of the particular data extraction configuration further specifies the first entity type as the parent entity or a child entity type in the set of child entity types.

14. The method of claim 8, wherein a particular data extraction configuration in the subset of the plurality of data extraction configurations specifies a set of fields of the first entity type to extract.

15. A system comprising:
a set of processing units; and
a non-transitory machine-readable medium storing instructions that when executed by at least one processing unit in the set of processing units cause the at least one processing unit to:
receive a request to extract data for a first entity type;
in response to the request, determine a subset of a plurality of data extraction configurations associated with the first entity type; and
for each data extraction configuration in the subset of the plurality of data extraction configurations, process the data extraction configuration based on a set of transaction data to generate a set of data, the set of data comprising a first set of data included in a set of instances of the first entity type and a second set of data included in a set of instances of a second entity type,
wherein the set of transaction data is received from a set of applications that performed a set of transactions, wherein the set of transaction data is associated with the set of transactions performed by the set of applications.

16. The system of claim 15, wherein a particular data extraction configuration in the subset of the plurality of data extraction configurations specifies a set of data sources.

17. The system of claim 16, wherein a data source in the set of data sources of the particular data extraction configuration specifies the first entity type is a root entity type and the second entity type is a non-root entity type.

18. The system of claim 17, wherein processing the particular data extraction configuration based on the set of transaction data to generate the set of data comprises:
loading a third set of data included in the set of instances of the first entity type into a data view;
loading a fourth set of data included in the set of instances of the second entity type in the data view;
generating a query on the data view; and
executing the query.

19. The system of claim 17, wherein processing the particular data extraction configuration based on the set of transaction data to generate the set of data comprises identifying the set of instances of the first entity type in the set of transaction data, wherein each instance in the set of instances of the first entity type has a transaction date that falls within a defined range of time.

20. The system of claim 16, wherein a data source in the set of data sources of the particular data extraction configuration further specifies a parent entity type and a set of child entity types, wherein each child entity type in the set of child entity types has a set of attributes in common with the parent entity type, wherein the data sources of the particular data extraction configuration further specifies the first entity type as the parent entity or a child entity type in the set of child entity types.

* * * * *